United States Patent
Strunk

(10) Patent No.: US 11,906,100 B2
(45) Date of Patent: Feb. 20, 2024

(54) CRIMP FITTINGS AND SYSTEMS, KITS, AND METHODS INCORPORATING THE SAME

(71) Applicant: Titeflex Corporation, Springfield, MA (US)

(72) Inventor: Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 176 days.

(21) Appl. No.: 17/070,177

(22) Filed: Oct. 14, 2020

(65) Prior Publication Data
US 2021/0116056 A1    Apr. 22, 2021

Related U.S. Application Data

(63) Continuation of application No. PCT/US2020/055321, filed on Oct. 13, 2020.
(Continued)

(51) Int. Cl.
*F16L 9/06* (2006.01)
*F16L 9/18* (2006.01)
(Continued)

(52) U.S. Cl.
CPC ............ *F16L 9/06* (2013.01); *F16L 9/18* (2013.01); *F16L 25/0036* (2013.01);
(Continued)

(58) Field of Classification Search
CPC ..... F16L 9/06; F16L 25/0036; F16L 2201/10; F16L 11/15; F16L 11/11; F16L 13/141;
(Continued)

(56) References Cited

U.S. PATENT DOCUMENTS 3,224,794 A    12/1965 Crissy
3,605,817 A    9/1971 Bauman et al.
(Continued)

FOREIGN PATENT DOCUMENTS

CA    2303472 A1    9/2001
CN    203635704 U    6/2014
(Continued)

OTHER PUBLICATIONS

International Search Report and Written Opinion, International Patent Application No. PCT/US2020/055321, dated Jan. 29, 2021.
(Continued)

*Primary Examiner* — William S. Choi
(74) *Attorney, Agent, or Firm* — Saul Ewing LLP; Brian R. Landry

(57) ABSTRACT

One aspect of the invention provides a method including: obtaining a kit as described herein; advancing a cut end of the length of CSST over the nipple of the fitting; placing the crimping jaw over the cut end of the length of CSST and the fitting such that: the one or more alignment bosses are seated within the one or more alignment grooves; the one or more crimping points are seated within one or more of the corrugation valleys; and the one or more crimping points and the corrugation valleys are radially over the one or more annular corrugation grooves; and applying force to the crimping jaws, thereby forming a gas-tight seal between the cut end of the CSST and the fitting.

16 Claims, 9 Drawing Sheets

Related U.S. Application Data

(60) Provisional application No. 62/915,737, filed on Oct. 16, 2019.

(51) Int. Cl.
*F16L 39/00* (2006.01)
*F16L 25/00* (2006.01)

(52) U.S. Cl.
CPC ......... *F16L 39/005* (2013.01); *F16L 2201/10* (2013.01); *Y10T 29/49826* (2015.01)

(58) Field of Classification Search
CPC ............... F16L 13/143; F16L 2013/145; F16L 25/0063
USPC ......................................... 285/903, 256, 226
See application file for complete search history.

(56) References Cited

U.S. PATENT DOCUMENTS

| | | |
|---|---|---|
| 3,674,292 A | 7/1972 | Demler |
| 4,330,142 A | 5/1982 | Paini |
| 4,366,841 A | 1/1983 | Currie et al. |
| 4,369,992 A | 1/1983 | Fournier et al. |
| 4,729,583 A | 3/1988 | Lalikos et al. |
| 4,819,970 A | 4/1989 | Umehara |
| 5,209,267 A | 5/1993 | Morin |
| 5,413,147 A | 5/1995 | Moreiras et al. |
| 5,853,202 A | 12/1998 | Li et al. |
| 7,849,884 B2 | 12/2010 | Dickel |
| 8,485,562 B2* | 7/2013 | Zerrer ................. F16L 25/0036 285/903 |
| 8,814,223 B2* | 8/2014 | Choi .................. F16L 25/0036 285/903 |
| 2010/0007140 A1 | 1/2010 | Duquette et al. |
| 2010/0018040 A1 | 1/2010 | Bradley |
| 2010/0090459 A1 | 4/2010 | Duquette et al. |
| 2012/0049509 A1 | 3/2012 | Lininger et al. |
| 2013/0082461 A1 | 4/2013 | Hunter |
| 2015/0352700 A1 | 12/2015 | Hofmann |
| 2016/0138738 A1 | 5/2016 | Crompton et al. |
| 2016/0238167 A1 | 8/2016 | Hartmann et al. |
| 2018/0187803 A1 | 7/2018 | Strunk |
| 2019/0285213 A1 | 9/2019 | Tietze et al. |

FOREIGN PATENT DOCUMENTS

| | | |
|---|---|---|
| DE | 19833863 A1 | 2/2000 |
| EP | 0491737 A1 | 7/1992 |
| EP | 1705416 A1 | 9/2006 |
| EP | 2264348 A1 | 12/2010 |
| EP | 2423552 A1 | 2/2012 |
| GB | 1240562 A | 7/1971 |
| WO | 95/06838 A1 | 3/1995 |

OTHER PUBLICATIONS

"Wikipedia, Barb", https://en.wikipedia.org/wiki/Barb, downloaded Aug. 27, 2019.

"Wikipedia, Crimp (joining)", https://en.wikipedia.org/wiki/Crimp_(joining), downloaded Aug. 27, 2019.

Communication, Extended European Search Report, European Patent Application No. 20876820.0, dated Oct. 6, 2023, 9 pages.

* cited by examiner

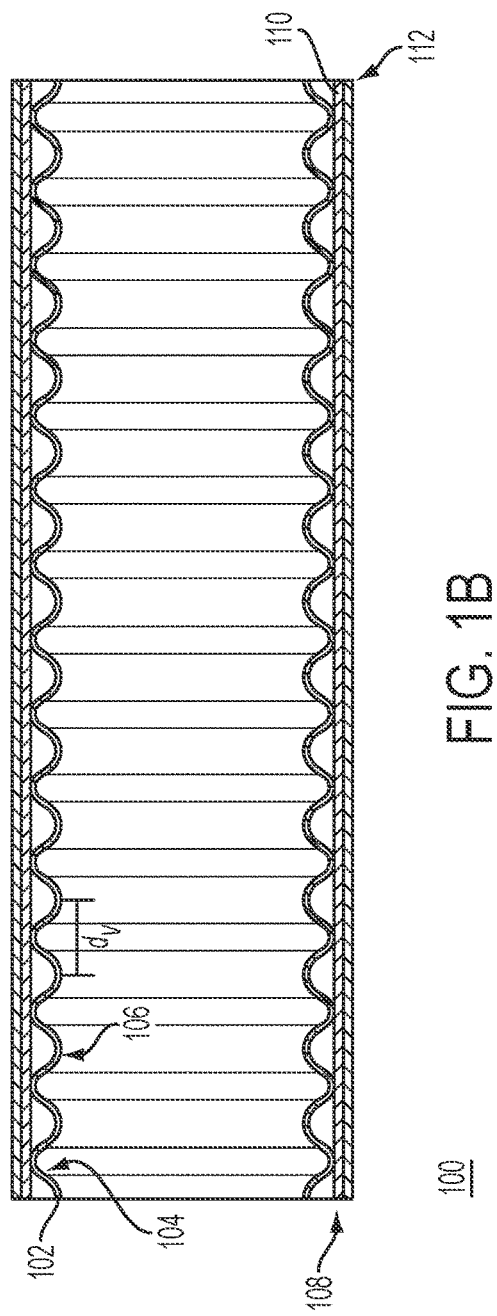
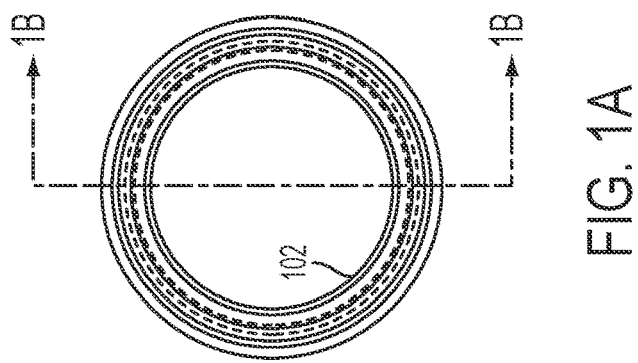
FIG. 1A
FIG. 1B

FIG. 3F SCALE 3:1

FIG. 3G SCALE 3:1

FIG. 3E SCALE 1:1

SCALE 3:1

SCALE 3:1

SCALE 1:1

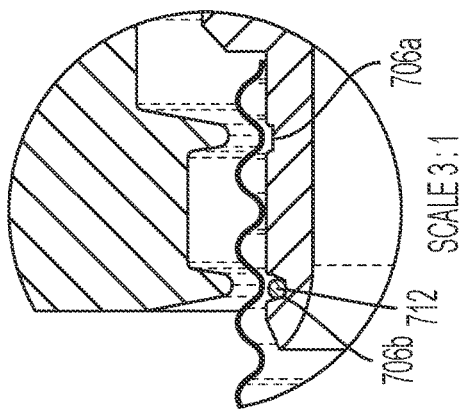
FIG. 7F SCALE 3:1
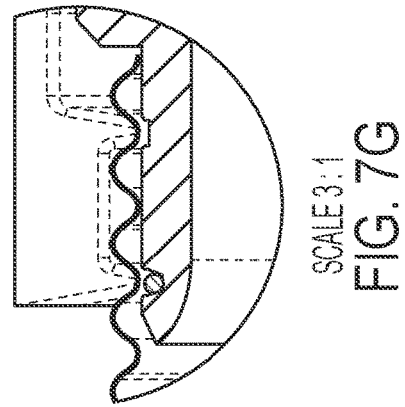
FIG. 7G SCALE 3:1
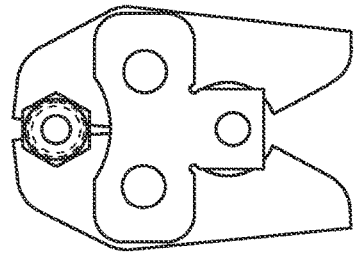
FIG. 7A
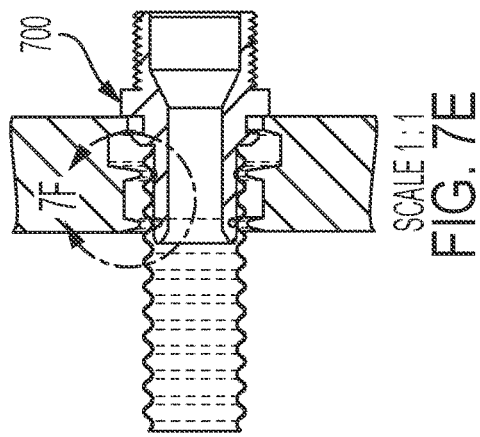
FIG. 7E SCALE 1:1
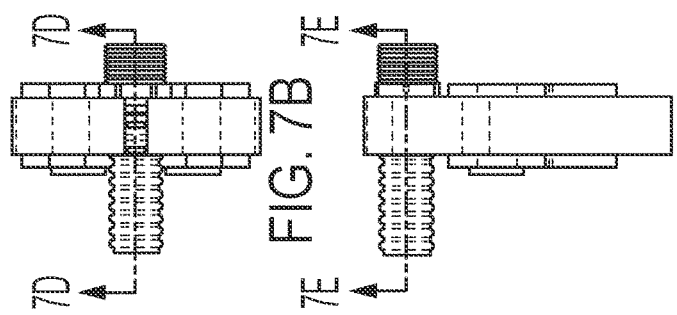
FIG. 7B  FIG. 7C
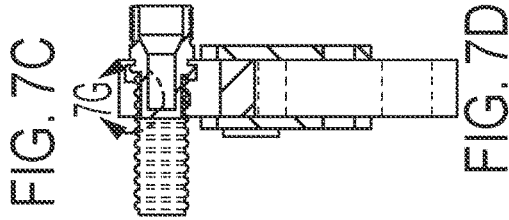
FIG. 7D

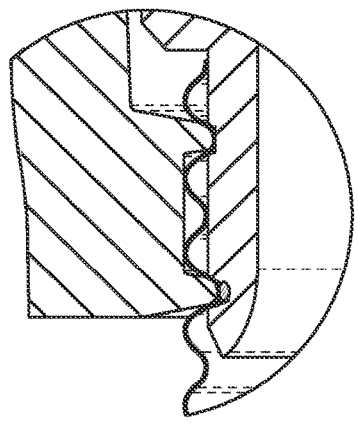
FIG. 8G
SCALE 3:1
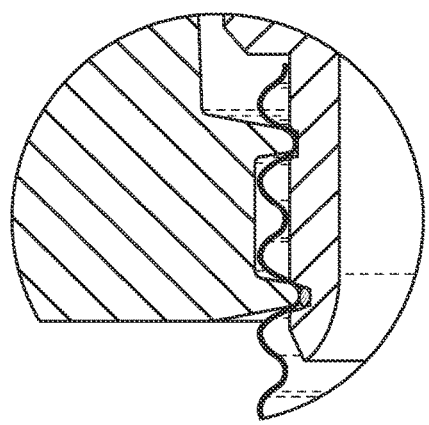
FIG. 8F
SCALE 3:1
FIG. 8A
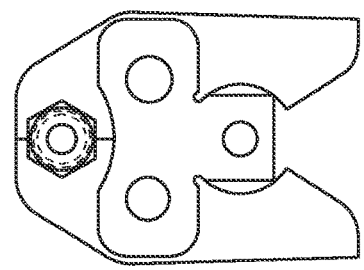
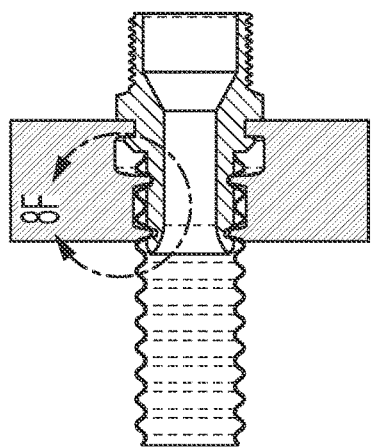
FIG. 8E
SCALE 1:1
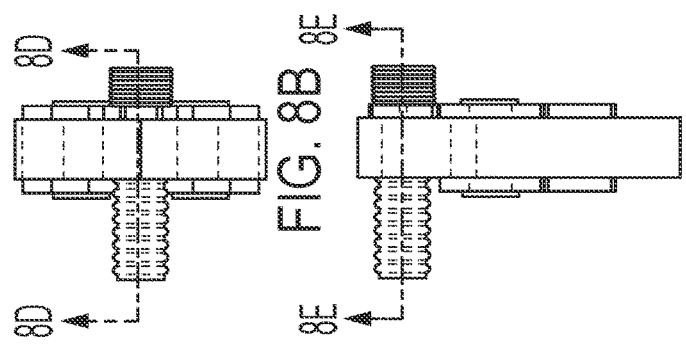
FIG. 8B
FIG. 8C
FIG. 8D

CRIMP FITTINGS AND SYSTEMS, KITS, AND METHODS INCORPORATING THE SAME

CROSS-REFERENCE TO RELATED APPLICATION

This application claims the benefit of priority to U.S. Provisional Patent Application Ser. No. 62/915,737, filed Oct. 16, 2019. The entire content of this application is hereby incorporated by reference herein.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings.

SUMMARY OF THE INVENTION

One aspect of the invention provides a kit including: a length of annular corrugated stainless steel tubing (CSST) and a fitting. The length of annular CSST includes: a plurality of corrugation peaks; and a plurality of corrugation valleys, the plurality of corrugation valleys defining an inner diameter and having a uniform longitudinal valley-to-valley distance. The fitting includes: a nipple having an outer diameter capable of insertion within the inner diameter of the length of CSST; and one or more annular crimping grooves along a radially-outer surface of the nipple; and an alignment feature on an outer surface of fitting. The one or more annular crimping grooves are positioned along the nipple relative to an alignment feature such that when one or more selected from the group consisting of a crimping jaw and a cut end of the length of CSST contacts the alignment feature, one of the corrugation valleys lies over each of the one or more annular grooves.

This aspect of the invention can have a variety of embodiments. The alignment feature can be an alignment groove. The crimping jaw can further include one or more bosses positioned to engaged with the alignment groove, thereby aligning the one or more annular crimping points over the one or more corrugation valleys lying over the one or more annular grooves of the nipple of the fitting.

The fitting can further include a gasket within the one or more annular crimping grooves. The fitting can include two or more annular crimping grooves, wherein: a first annular crimping groove does not include a gasket; and a second annular crimping groove includes a gasket. The gasket can be an O-ring. The first annular crimping groove can align with an nth corrugation valley from the cut end and the second annular crimping groove can align with an (n+2)th corrugation valley from the cut end, wherein n is a positive integer.

The kit can further include a cover including: a clip adapted and configured to engage with the alignment feature of the fitting; and a shroud coupled to the clip, the shroud adapted and configured to cover the cut end of the length of CSST at least to the one or more annular crimping grooves. The cover can further include a rib extending from the shroud. The rib can be adapted and configured to sit within a corrugation valley of the cut end of the length of CSST.

Another aspect of the invention provides a kit including: a length of annular corrugated stainless steel tubing (CSST); a crimping jaw; and a fitting. The length of annular CSST includes: a plurality of corrugation peaks; and a plurality of corrugation valleys, the plurality of corrugation valleys defining an inner diameter and having a uniform longitudinal valley-to-valley distance. The crimping jaw includes: one or more annular crimping points; and one or more alignment bosses. The fitting includes: a nipple having an outer diameter capable of insertion within the inner diameter of the length of CSST; one or more annular crimping grooves along a radially-outer surface of the nipple; and one or more alignment grooves along a radially-outer surface of the fitting. The one or more annular grooves are positioned along the nipple relative to one or more alignment grooves and the one or more crimping points are positioned along the crimping jaw relative to one or more alignment bosses such that when the one or more alignment bosses are seated within the one or more alignment grooves: the one or more crimping points are seated within one or more of the corrugation valleys; and the one or more crimping points and the corrugation valleys are radially over the one or more annular corrugation grooves.

This aspect of the invention can have a variety of embodiments. The fitting can include two or more annular crimping grooves, wherein: a first annular crimping groove does not include a gasket; and a second annular crimping groove includes a gasket. The first annular crimping groove can align with an nth corrugation valley from the cut end and the second annular crimping groove can align with an (n+2)th corrugation valley from the cut end, wherein n is a positive integer.

The kit can further include a cover including: a clip adapted and configured to engaged with the one or more alignment grooves of the fitting; and a shroud coupled to the clip, the shroud adapted and configured to cover the cut end of the length of CSST at least to the one or more annular crimping grooves. The cover can further include a rib extending from the shroud, the rib adapted and configured to sit within a corrugation valley of the cut end of the length of CSST.

Another aspect of the invention provides a method including: obtaining a kit as described herein; advancing a cut end of the length of CSST over the nipple of the fitting; placing the crimping jaw over the cut end of the length of CSST and the fitting such that: the one or more alignment bosses are seated within the one or more alignment grooves; the one or more crimping points are seated within one or more of the corrugation valleys; and the one or more crimping points and the corrugation valleys are radially over the one or more annular corrugation grooves; and applying force to the crimping jaws, thereby forming a gas-tight seal between the cut end of the CSST and the fitting.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIGS. 1A and 1B depict a multi-layer jacketed tube in accordance with the prior art.

FIGS. 3A-3G provide several views of a crimping jaw applied to a tubing-and-fitting assembly prior to crimping according to an embodiment of the invention.

FIGS. 7A-7G provide several views of a crimping jaw applied to a tubing-and-fitting assembly prior to crimping according to an embodiment of the invention.

FIGS. 8A-8G provide several views of a crimping jaw applied to a tubing-and-fitting assembly at the point of crimping according to an embodiment of the invention.

DEFINITIONS

Figure 2:
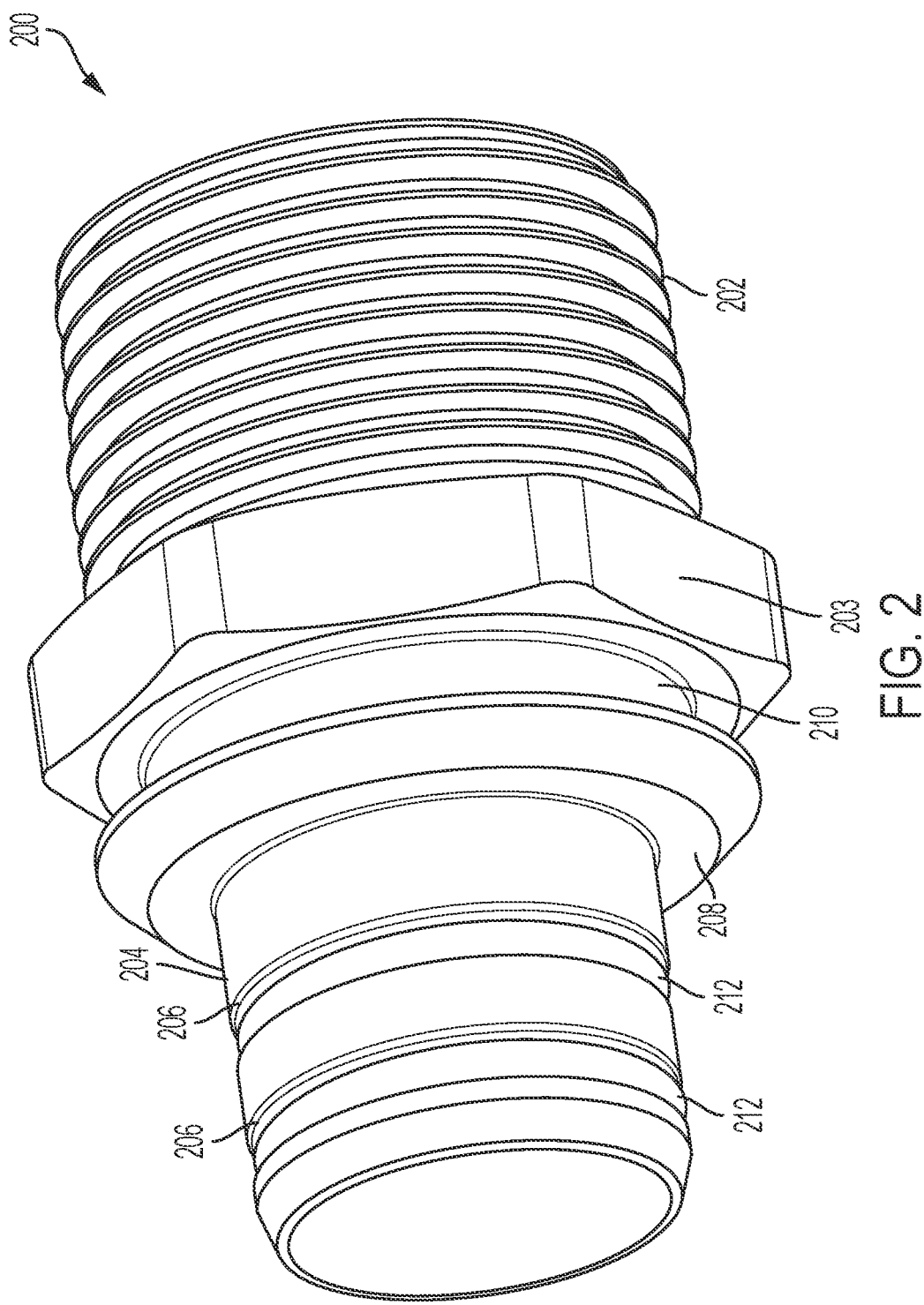
FIG. 2 provides a perspective view of a fitting according to an embodiment of the invention.
Figure 3A:
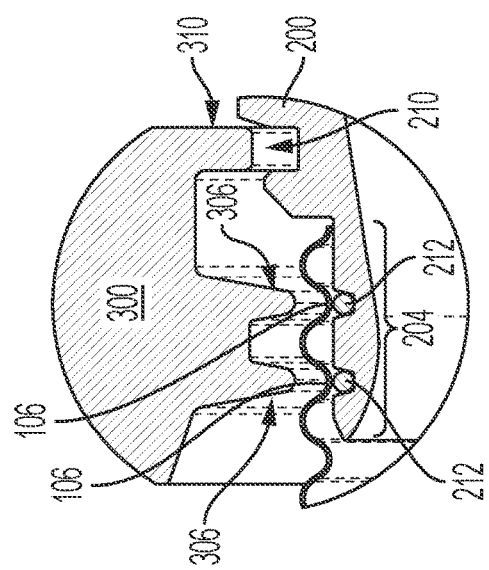
Figure 3A:
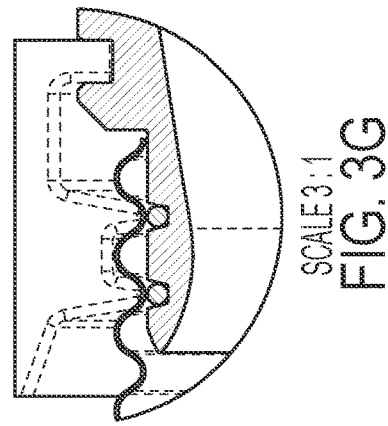
Figure 3A:
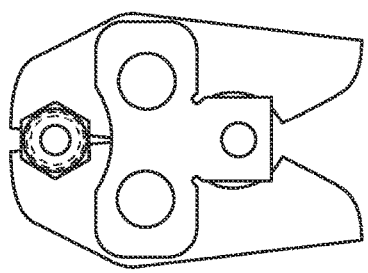
Figure 3B:
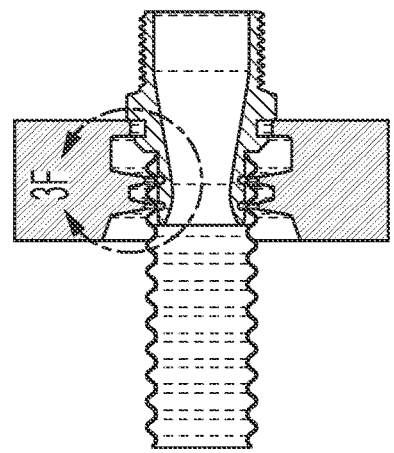
Figure 3B:
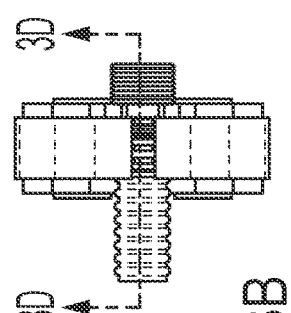
Figure 3C:
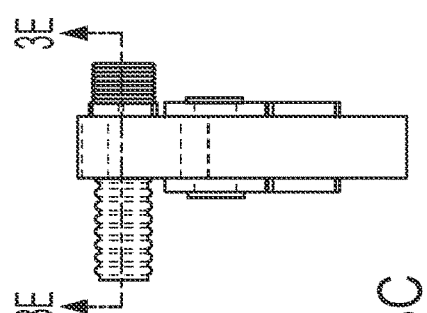
Figure 3D:
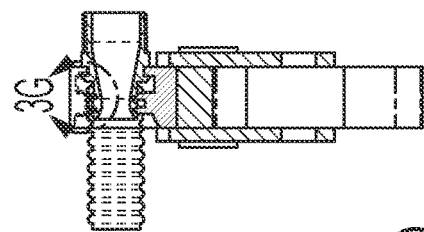
Figure 4F:
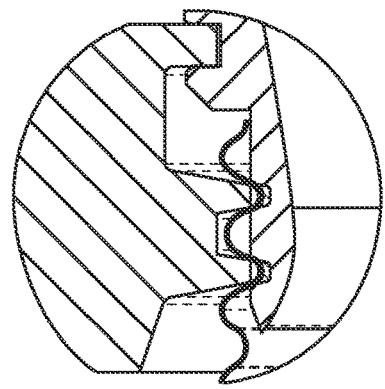
FIGS. 4A-4G provide several views of a crimping jaw applied to a tubing-and-fitting assembly at the point of crimping according to an embodiment of the invention.
Figure 4G:
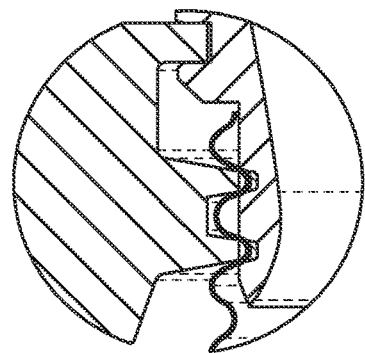
Figure 4A:
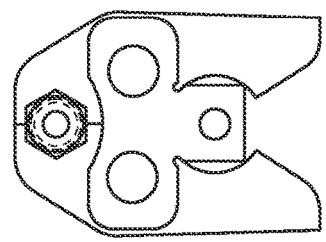
Figure 4E:
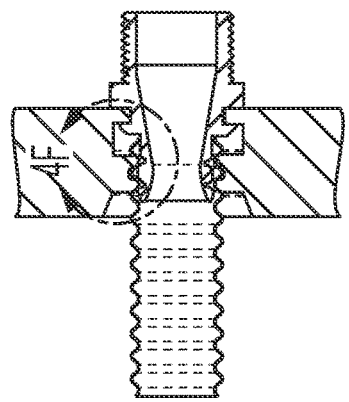
Figure 4B:
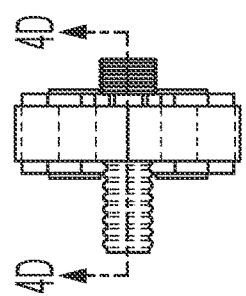
Figure 4C:
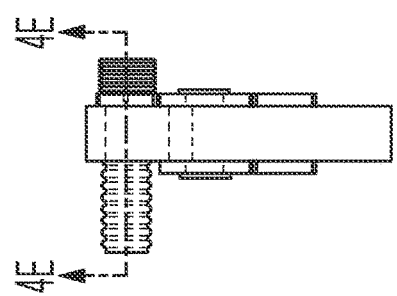
Figure 4D:
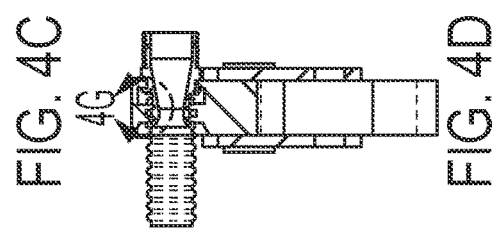

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based superalloys, brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used herein, the terms "corrugated stainless steel tubing" and "CSST" refer to any type of semi-flexible tubing or piping that can accommodate corrosive or aggressive gases or liquids. In some embodiments, CSST is designed and/or approved for conveyance of fuel gases such as natural gas, methane, propane, and the like. For example, CSST can comply with a standard such as the ANSI LC 1-2005/CSA 6.26-2005 Standard for Fuel Gas Piping Systems Using Corrugated Stainless Steel Tubing. The inventions described herein can be utilized in conjunction with all commercially available CSST products including, but not limited to CSST sold under the GASTITE® and FLASHSHIELD® brands by Titeflex Corporation of Portland, Tennessee; the TRACPIPE® and COUNTERSTRIKE® brands by Omega-Flex, Inc. of Exton, Pa.; the WARDFLEX® brand by Ward Manufacturing of Blossburg, Pennsylvania; the PRO-FLEX® brand by Tru-Flex Metal Hose Corp. of Hillsboro, Indiana; and the DIAMONDBACK™ brand by Metal Fab, Inc. of Wichita, Kans.

Unless specifically stated or obvious from context, the term "or," as used herein, is understood to be inclusive.

As used herein, the term "metal" refers to any chemical element (or compound or alloy thereof) that is a good conductor of electricity and/or heat. Examples of metals include, but are not limited to, aluminum, cadmium, niobium (also known as "columbium"), copper, tin, gold, iron, nickel, platinum, silver, tantalum, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Aspects of the invention provide crimp fittings and systems, kits, and methods incorporating the same. The crimp fittings advantageously provide an integral fitting that does not require any disassembly or reassembly or turning of nuts, thereby reducing installation time and avoiding the need to use a second wrench to hold one part of a fitting while advancing a nut.

Corrugated Tubing

Referring to FIGS. 1A and 1B, a length of tubing 100 is provided. The tubing 100 can include corrugated tubing 102 (e.g., corrugated stainless steel tubing) and a jacket 108. The corrugated tubing 102 contains a number of corrugation peaks 104 and corrugation valleys 106, which have a substantially uniform geometry and spacing. For example, the distance ok between adjacent corrugation valleys 106 (as measured from the inflection point in each valley) will be substantially uniform within particular type of tubing 102.

A jacket 108 (e.g., a single-layer or a multi-layer jacket) covers the outside of the tubing 102. The jacket 108 can include a plurality of layers 110, 112. In one embodiment, the jacket is a resin, such as a single-layer polyolefin jacket that a can be pigmented to a desired color (e.g., yellow). The layers 110, 112 generally form an annulus around the tubing 102, but may have a circular or non-circular cross-section. The jacket 108 can include one or more electrically conductive layers such as those described in U.S. Patent Application Publication No. 2018/0187803 and U.S. Pat. Nos. 8,905,083 and 9,249,904.

Fitting

Referring now to FIGS. 2-4G, a fitting 200 is provided. The fitting 200 allows for the sealing and coupling of an end of tubing 100 to a device such as a fuel gas source, an appliance, another fitting, and the like (not depicted). Although the fitting 200 depicted includes male threads 202 and can be sized to mate with common pipe sizes (e.g., ½", ¾", 1", 1¾", 1½", 2" Nominal Pipe Size), the fitting 200 can include female threads or other geometries for coupling with another device. In some embodiments, the fitting includes a hexagonal region 203 that allows for tightening of threaded region 202 into a complimentary device using a wrench, pliers, or other tool.

The fitting 200 can further include a nipple 204. The nipple 204 can be on an opposite end of the fitting 200 from threads 202. The nipple 204 can having an outer diameter capable of insertion within the inner diameter of the length of tubing 100. The nipple 204 can fit freely within the inner diameter of the length of tubing 202 or can be sized to fit snuggly within the tubing 202, e.g., requiring some force to advance the tubing 202 and/or fitting 200 until the one or more corrugation valleys 106 seat within one or more annular grooves 206 of the fitting 200.

The one or more annular grooves 206 can be formed along a radially-outer surface of the nipple 204. The one or more annular grooves 206 can be positioned along the fitting 200 to facilitate alignment with one or more corrugation valleys 106. For example, the crimping grooves 206 can be positioned to align with adjacent corrugation valleys 106 as depicted in FIGS. 2-4 and 6 or non-adjacent corrugation valleys 106, e.g., first and third complete corrugation valleys 106 as depicted in FIGS. 7A-9G, first and fourth complete corrugation valleys 106, n and (n+m)th complete valley wherein n and m are positive integers, and the like. The width and diameter of crimping grooves 206 can be sized to provide adequate holding power when tubing 100 is crimped to prevent loosening of fitting.

For example, CSST 100 is often specified to be cut with a tubing cutter at a corrugation valley 106, as depicted in FIGS. 1, 3A-3G, 4A-4G, and 6. In one embodiment of the invention, a stop shoulder 208 can be provided (e.g., perpendicular to nipple 204) at a desired distance relative to annular groove(s) 206 such that corrugation valley(s) 106 will lie over annular groove(s) 206 when the tubing 100 is advanced such that the cut end contacts the stop shoulder 208.

Another embodiment of the invention utilizes an alignment groove 210. The alignment groove 210 can be positioned on the nipple 204 or distal to the nipple 204. The alignment groove 210 receives one or more bosses 310 (e.g., annular bosses) on a crimping jaw 300. The positions of the alignment groove 210 and the crimping grooves 206 on the fitting 200 and the bosses 310 and the crimping points 306 on the crimping jaw 300 ensure that when the bosses 310 of the crimping jaw 300 lie within the alignment groove 210 of the fitting, the crimping points 306 on the crimping jaw 300 will engage with one or more corrugation valleys 106 and position the length of tubing 100 axially such that one or more corrugation valleys lie over one or more crimping grooves 206. The depth of the alignment groove 210 (e.g., as defined by adjacent walls) may be deeper than the crimping groove(s) 206 in order to facilitate axial engagement of the bosses 310 on crimping jaw 300 both before and during crimping for alignment, whereas the crimping points 306 on the crimping jaw 300 may only engage the crimping grooves 206 (via compressing of tubing 100) during crimping.

The crimping grooves 206 can optionally include a sealing member 212 such as a gasket, an O-ring, a grease, a gel, and the like. For example, nipple 204 can include a first groove including an O-ring to provide a gas-tight seal and a second groove without an O-ring to provide additional mechanical holding power. However, and without being bound by theory, Applicant believes that a gas-tight seal can be formed solely through metal-to-metal crimping (e.g., within typical operating pressures such as ≤5 psi or ≤35 kPa).

For example, referring now to FIGS. 7-9, embodiments of the fitting 700 can include a first crimping groove 706a that does not include a gasket and a second crimping groove 706b including a gasket 712. The crimping grooves 706a, 706b can, but need not, have different dimensions such as depth and/or width in order to accommodate gasket 712 or the absence thereof. In some embodiments, and without being bound by theory, the ungasketed groove 706a may primarily provide mechanical strength to prevent separation of the tubing 100 from the fitting 700, e.g., when subjected to axial loads, while the gasketed groove 706b primarily provides sealing.

Notably, and without being bound by theory, Applicant believes that a durable gas-tight seal can be achieved without the need for a crimping ring or collar external to the stripped tubing 100.

Crimping Tools

FIGS. 3A-3G and 4A-4G include depictions of an exemplary jaw 300 for crimping tubing over a fitting. Such jaws can be adapted to work with a variety of commercial crimping and/or press tools including those available from Milwaukee Tool of Brookfield, Wisconsin; Ridgid Tool Company of Elyria, Ohio; Stanley Black & Decker, Inc. of Towson, Md.; Rothenberger USA LLC of Loves Park, Illinois; and Viega LLC of Broomfield, Colorado. For example, some presses use an electric (e.g. battery-powered) motor to generate hydraulic pressure that is exerted on jaw 300. When the pressure is released (e.g., prior to sealing), the jaws can pivot to open and receive the tubing and fitting. The jaws may be spring-loaded in order to close on the tubing and fitting to facilitate alignment of corrugation valleys 106 and corrugation grooves 206 before crimping. The jaws 300 can be detached from the crimping tool to facilitate use of a common tool across a variety of fittings. In addition, jaws 300 can be configured for use in a manually operated tool having long handles to actuate the jaws and provide adequate crimping force.

Methods of Installing Tubing

Figure 5:
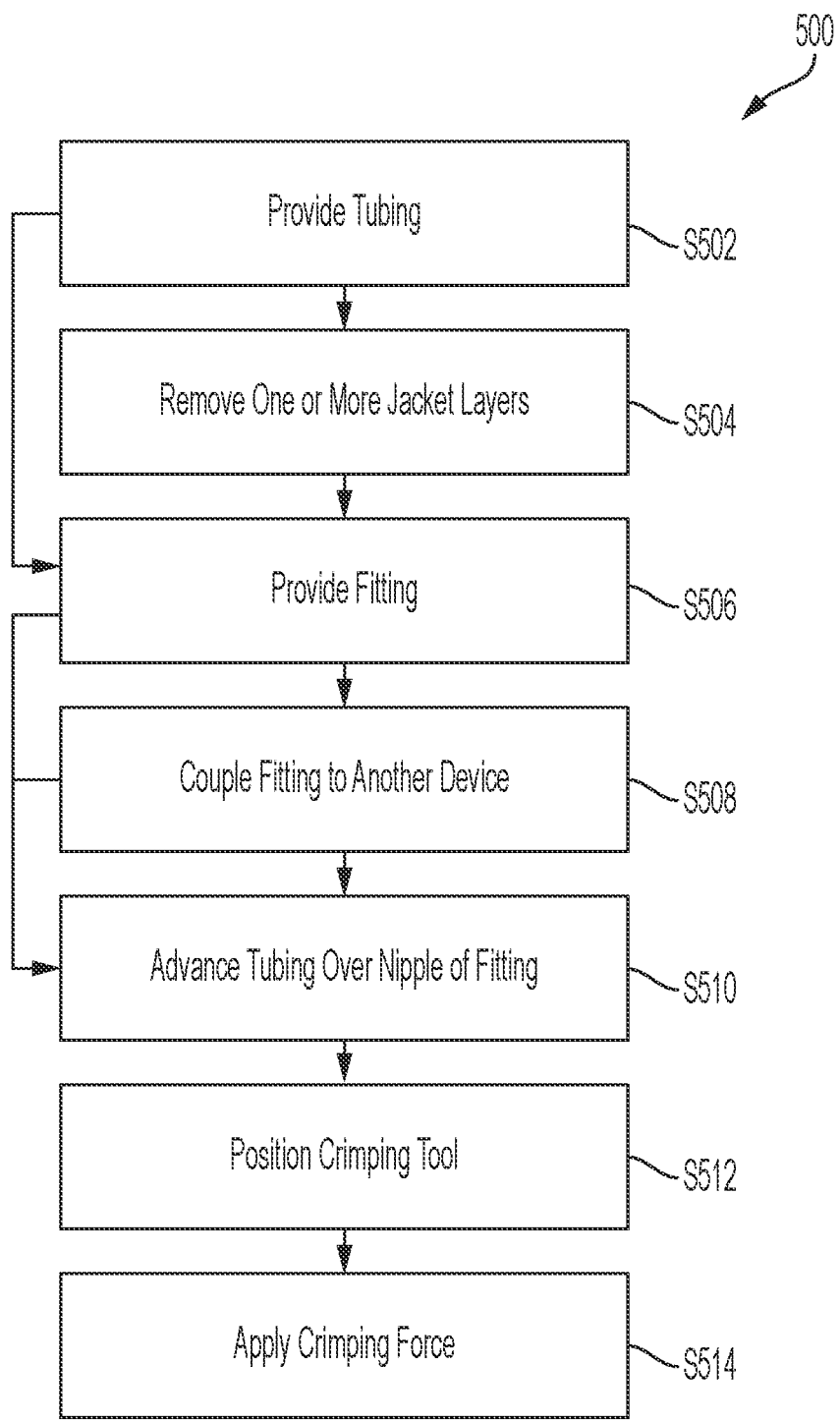
FIG. 5 depicts a method for installing tubing in accordance with a preferred embodiment of the invention.
Figure 6:
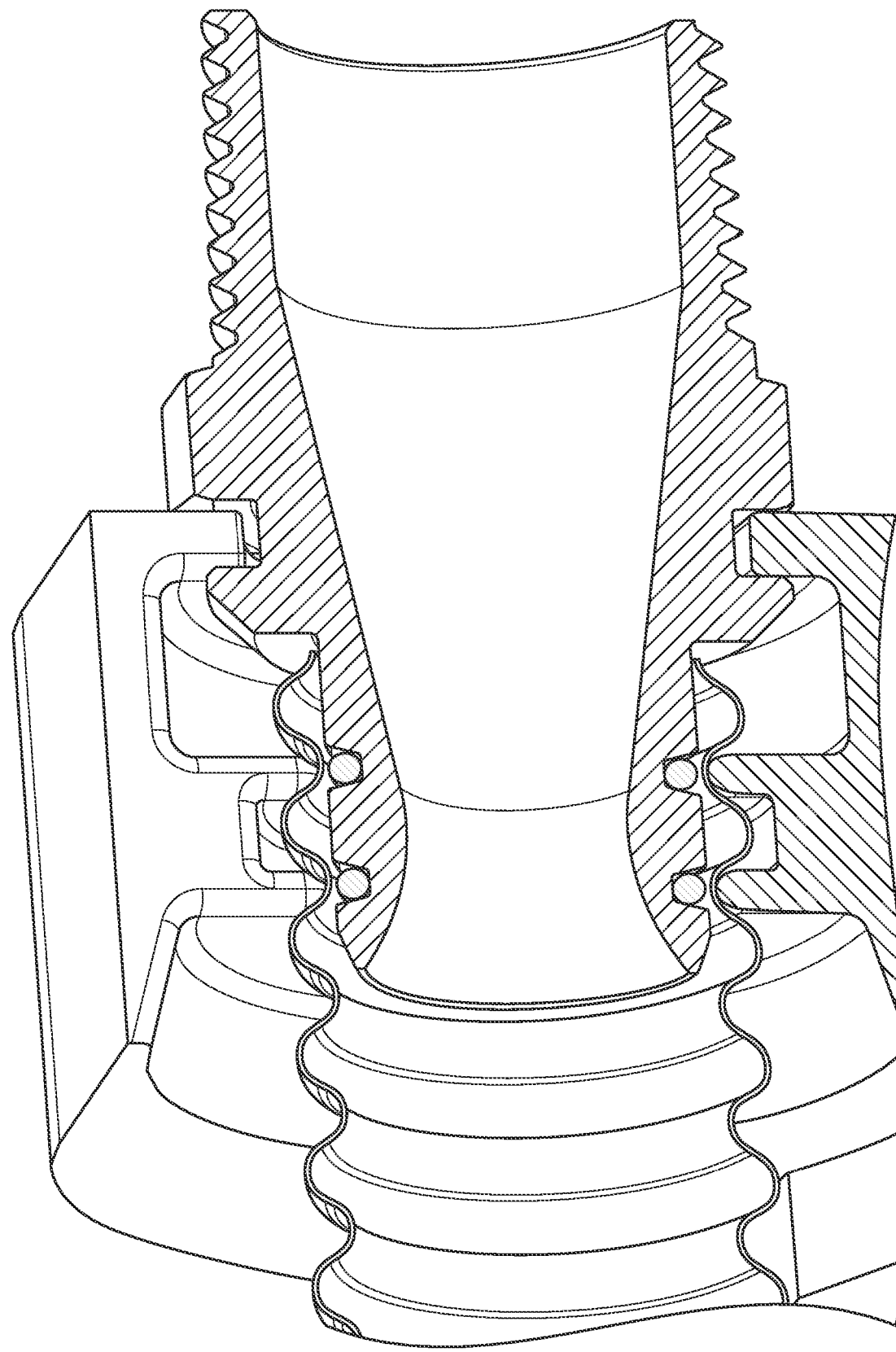
FIG. 6 provides a perspective cross-sectional view of a fitting after advancement of tubing and seating of crimping jaws, but before crimping according to an embodiment of the invention.
Figure 9E:
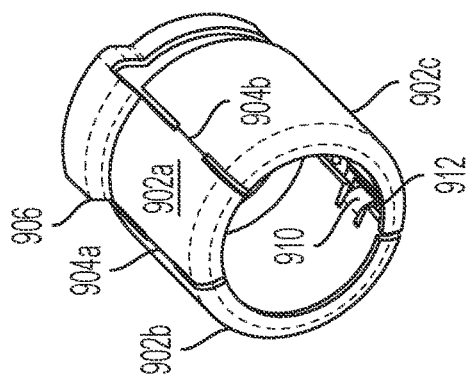
FIGS. 9A-9G provide several views of a cover applied over a fitting and tubing according to an embodiment of the invention.
Figure 9F:
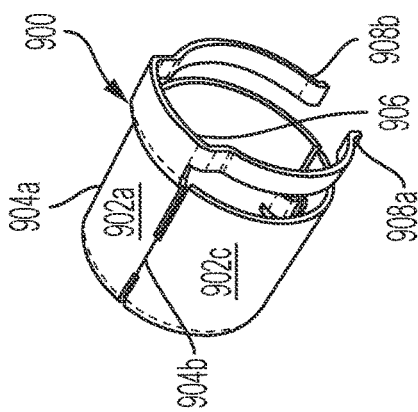
Figure 9A:
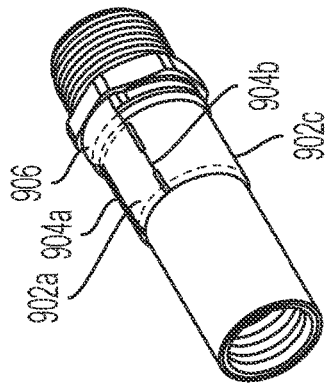
Figure 9B:
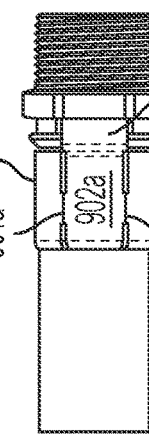
Figure 9C:
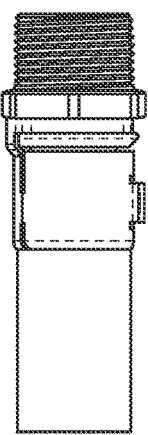
Figure 9D:
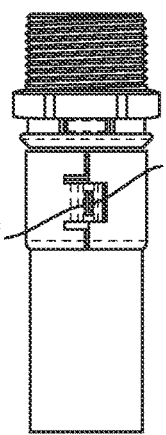
Figure 9G:
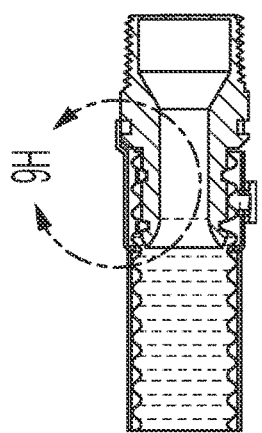
Figure 9H:
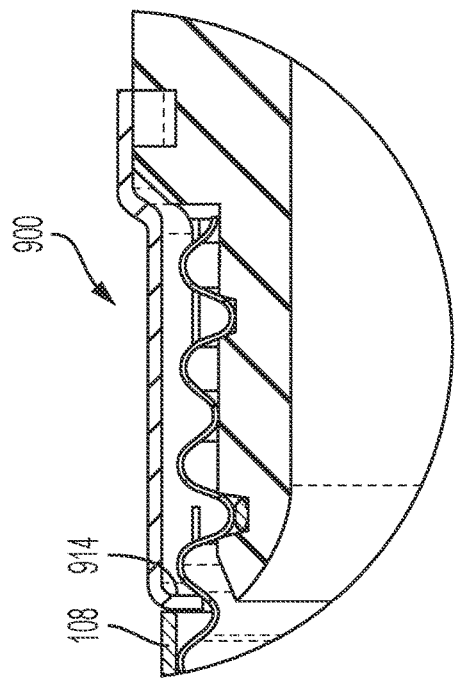

An exemplary method 500 for installing energy dissipative tubing is depicted in FIG. 5.

In step S502, a length of tubing is provided. Tubing can, in some embodiments, be CSST such as unjacketed CSST, jacketed CSST, and energy-dissipative CSST. Tubing can be provided in lengths (e.g., 8' sticks, 3 meter sticks) or on reels.

In step S504, one or more jacket layers are optionally removed in accordance with the instructions for a fitting. The one or more layers can be removed with existing tools such as a utility knife, a razor blade, a tubing cutter, a jacket-stripping tool, and the like. Exemplary jacket-stripping tools are described in U.S. Patent Application Publication No. 2014/0373694 and are available from Titeflex Corporation of Portland, Tennessee. Preferably, all jacket layers are removed from a leading end of the tubing. For example, all jacket layers can be removed to expose at least the first two corrugation peaks.

In step S506, a fitting is provided as described herein.

In step S508, the fitting is optionally coupled to another device. For example, the fitting can be coupled to a source of a fuel gas such as a pipe, a manifold, a meter, a gas main, a tank, and the like. In another example, the fitting can be coupled to an appliance that consumes a fuel gas such as a stove, an oven, a grill, a furnace, a clothes dryer, a fire place, a generator, and the like. In another example, the fitting can be coupled to another fitting, e.g., to couple two lengths of tubing. The sealing device can be coupled to the other device by threaded or other attachments. In some circumstances, pipe seal tape (e.g., polytetrafluoroethylene tape) or pipe seal compound (commonly referred to as "pipe dope") is utilized to facilitate a gas-tight seal between the fitting and the other device.

In step S510, the tubing is advanced over the nipple of the fitting. The tubing can be positioned such that a corrugation valley lies over or is proximal to a crimping groove, a cut end contacts a stop shoulder, and the like.

In step S512, a crimping tool contacts the outer surface of the tubing. The crimping tool can also contact an alignment groove on the fitting. In some embodiments, initial placement of the crimping tool may shift the tubing axially with respect to the nipple to align one or more corrugations valleys over one or more corrugation grooves.

In step S514, the crimping tool applies pressure to crimp the tubing over the nipple and form gas-tight seal.

In further embodiments, one or more clips (e.g., sheet metal clips) can be applied over the tubing and/or the fitting in order to facilitate electrical bonding between the tubing (e.g., electrically conductive jacket layers) and the fitting.

Fitting Cover

Referring now to FIG. 9, embodiments of the invention can include a cover 900. Cover 900 can include one or more shroud members 902a, 902b, 902c that can substantially envelop the stripped end of tubing 100. In one embodiment depicted in FIG. 9, the shroud members 902a-902c can include a fixed member 902a about which movable shroud members 902b, 902c can rotate. For example, movable shroud members 902b, 902c can be coupled to fixed shroud member 902a by living hinges 904a, 904b (which can be defined, e.g., reduced material, scoring, marking, perforation, and the like).

Cover 900 can include a clip 906 including one or more fingers 908a, 908b. Fingers 908a, 908b can be sized to fit within the alignment groove 210. Clip 906 and fingers 908a, 908b can have shape memory such that fingers 908a, 908b deform when slid over the alignment groove 210 and press against the alignment groove 210. Cover 900 can also contact other portions of fittings 200, 700.

Covering members 902b, 902c can be coupled together during installation. For example, clip 900 includes a cooperating tab 910 and slot 912, one or both of which can resiliently deform in order to engage with each other. In other embodiments, an external fastener such as safety wire, a screw, a rivet, a pin, and the like can be applied and secured.

Cover 900 can extend adjacent to jacket 108. For example, cover 900 can be sized such that it will contact jacket 108 when stripped to the center of a corrugation valley 106. Contact is not required for electrical grounding, especially when the cover 900 includes a rib 914 that extends under into corrugation valley 106, e.g., beyond a conductive jacket layer. As discussed in U.S. Patent Application Publication No. 2018/0187803, and without being bound by theory, Applicant believes that electrical impulses dissipated by jacket 106 have a directionality and will exit from the end of jacket 106 in a substantially axially direction.

Cover 900 can be fabricated from an electrically conductive material such as a metal in order to distribute any electrical impulses from jacket 106 to fitting 200, 700. Cover 900 can be fabricated through various techniques including stamping, cold-forming, pressing, machining, casting, and the like.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A kit comprising:
   a length of annular corrugated stainless steel tubing (CSST) comprising:
      a plurality of corrugation peaks; and
      a plurality of corrugation valleys, the plurality of corrugation valleys defining an inner diameter and having a uniform longitudinal valley-to-valley distance;
      wherein the plurality of corrugation peaks and the plurality of corrugation valleys extend to each end of the length of CSST; and
   a fitting comprising:
      a nipple having an outer diameter capable of insertion within the inner diameter of a cut end of the length of CSST; and
      one or more annular crimping grooves along a radially-outer surface of the nipple; and
      an alignment feature on an outer surface of fitting;
      wherein the one or more annular crimping grooves are positioned along the nipple relative to the alignment feature such that when a crimping jaw contacts the alignment feature, one or more of the corrugation valleys of the cut end of the length of CSST lies over each of the one or more annular crimping grooves.

2. The kit of claim 1, wherein the alignment feature is an alignment groove.

3. The kit of claim 2, wherein the crimping jaw further comprises one or more bosses positioned to engaged with the alignment groove, thereby aligning one or more annular crimping points over the one or more corrugation valleys lying over the one or more annular crimping grooves of the nipple of the fitting.

4. The kit of claim 1, wherein the fitting further comprises a gasket within the one or more annular crimping grooves.

5. The kit of claim 4, wherein the gasket is an O-ring.

6. The kit of claim 1, wherein the fitting comprises two or more annular crimping grooves, wherein:
   a first annular crimping groove does not comprise a gasket; and
   a second annular crimping groove comprises a gasket.

7. The kit of claim 6, wherein the gasket is an O-ring.

8. The kit of claim 6, wherein:
   the first annular crimping groove aligns with an nth corrugation valley from the cut end; and
   the second annular crimping groove aligns with an (n+2)th corrugation valley from the cut end;
   wherein n is a positive integer.

9. The kit of claim 1, further comprising:
   a cover comprising:
      a clip adapted and configured to engage with the alignment feature of the fitting; and
      a shroud coupled to the clip, the shroud adapted and configured to cover the cut end of the length of CSST at least to the one or more annular crimping grooves.

10. The kit of claim 9, wherein the cover further comprises:
   a rib extending from the shroud, the rib adapted and configured to sit within a corrugation valley of the cut end of the length of CSST.

11. A kit comprising:
a length of annular corrugated stainless steel tubing (CSST) comprising:
  a plurality of corrugation peaks; and
  a plurality of corrugation valleys, the plurality of corrugation valleys defining an inner diameter and having a uniform longitudinal valley-to-valley distance;
  wherein the plurality of corrugation peaks and the plurality of corrugation valleys extend to each end of the length of CSST;
a crimping jaw comprising:
  one or more annular crimping points; and
  one or more alignment bosses; and
a fitting comprising:
  a nipple having an outer diameter capable of insertion within the inner diameter of a cut end of the length of CSST;
  one or more annular crimping grooves along a radially-outer surface of the nipple; and
  one or more alignment grooves along a radially-outer surface of the fitting;
wherein the one or more annular crimping grooves are positioned along the nipple relative to one or more alignment grooves and the one or more annular crimping points are positioned along the crimping jaw relative to one or more alignment bosses such that when the one or more alignment bosses are seated within the one or more alignment grooves:
  the one or more annular crimping points are seated within one or more of the corrugation valleys of the cut end of the length of CSST; and
  the one or more annular crimping points and the corrugation valleys of the cut end of the length of CSST are radially over the one or more annular crimping grooves of the nipple of the fitting.

12. The kit of claim 11, wherein the fitting comprises two or more annular crimping grooves, wherein:
  a first annular crimping groove does not comprise a gasket; and
  a second annular crimping groove comprises a gasket.

13. The kit of claim 12, wherein:
  the first annular crimping groove aligns with an nth corrugation valley from the cut end; and
  the second annular crimping groove aligns with an (n+2)th corrugation valley from the cut end;
  wherein n is a positive integer.

14. The kit of claim 11, further comprising:
a cover comprising:
  a clip adapted and configured to engaged with the one or more alignment grooves of the fitting; and
  a shroud coupled to the clip, the shroud adapted and configured to cover the cut end of the length of CSST at least to the one or more annular crimping grooves.

15. The kit of claim 14, wherein the cover further comprises:
  a rib extending from the shroud, the rib adapted and configured to sit within a corrugation valley of the cut end of the length of CSST.

16. A method comprising:
obtaining a kit comprising:
  a length of annular corrugated stainless steel tubing (CSST) comprising:
    a plurality of corrugation peaks; and
    a plurality of corrugation valleys, the plurality of corrugation valleys defining an inner diameter and having a uniform longitudinal valley-to-valley distance;
    wherein the plurality of corrugation peaks and the plurality of corrugation valleys extend to each end of the length of CSST;
  a crimping jaw comprising:
    one or more annular crimping points; and
    one or more alignment bosses; and
  a fitting comprising:
    a nipple having an outer diameter capable of insertion within the inner diameter of a cut end of the length of CSST;
    one or more annular crimping grooves along a radially-outer surface of the nipple; and
    one or more alignment grooves along a radially-outer surface of the fitting;
  wherein the one or more annular crimping grooves are positioned along the nipple relative to one or more alignment grooves and the one or more annular crimping points are positioned along the crimping jaw relative to one or more alignment bosses such that when the one or more alignment bosses are seated within the one or more alignment grooves:
    the one or more annular crimping points are seated within one or more of the corrugation valleys of the cut end of the length of CSST; and
    the one or more annular crimping points and the corrugation valleys are radially over the one or more annular crimping grooves of the cut end of the length of CSST;
advancing the cut end of the length of CSST over the nipple of the fitting;
placing the crimping jaw over the cut end of the length of CSST and the fitting such that:
  the one or more alignment bosses are seated within the one or more alignment grooves;
  the one or more annular crimping points are seated within one or more of the corrugation valleys of the cut end of the length of CSST; and
  the one or more annular crimping points and the corrugation valleys are radially over the one or more annular crimping grooves of the nipple of the fitting; and
applying force to the crimping jaws, thereby forming a gas-tight seal between the cut end of the CSST and the fitting.

* * * * *